ns3,297,626
Patented Jan. 10, 1967

3,297,626
SULFUR-CURABLE COMPOSITIONS CONTAINING POLY-UNSATURATED COMPOUNDS AS CURING PROMOTERS
John Frederick Smith, Wilmington, Del., assignor to E. I. du Pont de Nemours and Company, Wilmington, Del., a corporation of Delaware
No Drawing. Filed Nov. 15, 1962, Ser. No. 238,002
14 Claims. (Cl. 260—41.5)

This invention relates to sulfur-curable, filler-loaded elastomeric composition. More particularly, it relates to sulfur-cured, filler-loaded elastomers and methods for their preparation.

Sulfur-curable α-olefin hydrocarbon copolymers are acquiring increasing importance today in the manufacture of a wide variety of useful products. For some applications, such as shoe soles and heels, it is desirable that a large proportion of a reinforcing kaolin clay filler be present along with the α-olefin copolymer. Although such compositions can be cured by numerous sulfur-curing systems, the vulcanizates obtained require a higher modulus and lower compression sets for the contemplated uses. For other applications, such as vent window seals and molded corners on windshield gaskets, it is desirable that a large proportion of a reinforcing carbon black be used to extend the α-olefin copolymer; however, the compression sets at 100° C. of the vulcanizates obtained with the usual sulfur curing systems have left something to be desired. Butyl rubber, likewise, is extended with clays and carbon blacks for many applications and it would be desirable that the vulcanizates obtained from these compositions display a smaller compression set and a higher modulus without the necessity for employing a heat-treatment prior to the curing process. It is known that improved results can be attained, to some extent, if these filled stocks are specially heat-treated prior to incorporation of the curing agent, and it has also been found that this heat-treatment is made more effective if certain promoters are present during the heat-treatment such as the dinitroso, dioxime, and aromatic quinoid compounds. It is, however, quite inconvenient and expensive to carry out the heat-treatment process. The extra time required to cool the heat-treated stocks before the curing agents can be added lowers the production rate.

It is, therefore, an object of the present invention to provide novel loaded hydrocarbon compositions displaying improved curability. It is a further object to provide novel sulfur-cured, filler-loaded α-olefin and butyl rubber copolymer compositions and methods for their preparation. Another object is to provide such compositions which display improved modulus and a lower compression set. Yet another object is to provide such compositions by a process which obviates the need for an intervening heat-treatment step. Other objects will appear hereinafter.

These and other objects are accomplished in accordance with this invention by a process for preparing a sulfur-cured, filler-loaded elastomeric composition which comprises mixing (I) a normally solid elastomeric copolymer selected from the group consisting of (a) a copolymer of at least one α-monoolefin and at least one non-conjugated hydrocarbon diene of from 5 to 22 carbon atoms, said copolymer having up to about 2 gram-moles of carbon-to-carbon double bonds per kilogram, and (b) a copolymer of an isoolefin and a conjugated diene, said isoolefin and diene having from 4 to 14 carbon atoms, and said copolymer having an iodine number of from 1 to about 50; (II) from about 20 to 300 parts of a filler compound per 100 parts of copolymer, (III) up to about 10 parts, per part of copolymer of a monomeric promoter compound selected from the group consisting of di-lower alkenyl esters of unsaturated dicarboxylic acids and N-lower alkenyl substituted amides, said promoter compound having at least 3 sulfur-reactable carbon-to-carbon double bonds per molecule; and (IV) a sulfur-curing system in amounts containing sufficient sulfur to react with said copolymer and said promoter compound; and heating the mixture to effect a cure.

The principal elastomer can be a normally solid elastomeric copolymer of at least one α-monoolefin and at least one non-conjugated hydrocarbon diene.

The α-monoolefins have the structure R—CH=CH$_2$, wherein R is H or C$_1$–C$_{16}$ alkyl. Representative examples of useful α-monoolefins include: propylene; 1-butene; 4-methyl-1-pentene; 1-pentene; 1-hexene; 1-heptene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1-hexene; 5,6,6-trimethyl-1-heptene; 1-dodecene; and 1-octadecene. The straight chain olefins are preferred.

Representative dienes include open-chain compounds of the formula

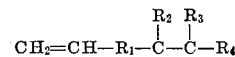

wherein R$_1$ is an alkylene radical, R$_2$ and R$_3$ are independently selected from the group consisting of hydrogen and alkyl radicals, and R$_4$ is an alkyl radical and wherein R$_1$ to R$_4$ are so selected that the diene has from about 6 to 22 carbon atoms. Examples of these dienes include: 1,4 - hexadiene; 1,9 - octadecadiene; 6 - methyl - 1,5 - heptadiene; 7 - methyl - 1,6 - octadiene; 11 - ethyl - 1,11 - tridecadiene; 9-ethyl-1,9-undecadiene; 7-ethyl-1,7-nonadiene; 8-propyl-1,8-undecadiene; 8-ethyl-1,8-decadiene; 10-ethyl-1,9-dodecadiene; 12-ethyl-1,12-tetradecadiene; 13-n-butyl-1,12-heptadecadiene; and 15-ethyl-1,15-heptadecadiene. Open-chain dienes having two terminal non-conjugated carbon-to-carbon double bonds, e.g., 1,5-hexadiene or 1,4-pentadiene can be used but are less preferred. Representative cyclic non-conjugated dienes include: dicyclopentadiene; 5-alkenyl-substituted-2-norbornene; 5-methylene-2-norbornene; 2-alkyl-2,5-norbornadienes.

Representative examples of copolymers made from these α-monoolefins and the above-described non-conjugated dienes and their preparation are described in U.S. Patents 2,933,480 and 3,000,866 and in French Patents 1,285,090 and 1,302,690. Particularly preferred are copolymers of from about 30 to 70 weight percent ethylene, 30 to 70 weight percent propylene and about 3 to 8 weight percent 1,4-hexadiene or dicyclopentadiene. As previously stated, these copolymers have up to about 2 gram-moles of carbon-to-carbon double bonds per kilogram.

These α-olefin copolymers can be oil extended before they are cured by the present invention. Copolymers having Mooney (ML–4/100° C.) viscosities of at least 50, preferably higher, and inherent viscosities of 1.8 or above (measured on a 0.1% by weight solution in tetrachloroethylene at 30° C.) have been found to be suitable. The oils used are petroleum oils having a flash point of at least about 300° F. and a viscosity-gravity constant in the range of from 0.80 to 1.0, preferably 0.80 to 0.90. The particularly preferred oils have a total nitrogen base and first acidaffin content of not greater than 15% by weight as determined by the Rostler method, described in Industrial and Engineering Chemistry, vol. 41, pages 598 to 608, March 1949. The viscosity-gravity constant is described in the 1958 booklet, "A Graphic Method for Selecting Oils Used in Compounding and Extending Butadiene-Styrene Rubbers" (Industrial Products Department, Sun Oil Company, Philadelphia, Pennsylvania, 1958). Representative oils include paraffinic oils, naphthenic, relatively aromatic, and aromatic oils. The petroleum oil can be introduced into the copolymer any time after the polymerization reaction is finished. The petroleum oil can be added to the solution, the resulting mixture obtained being pumped to a drum dryer to remove the solvent. Alternatively, the petroleum oil can be introduced at the nip of the drum dryer along with the polymer solution. If desired, petroleum oil can be introduced into the dried copolymer stock in a Banbury mixer or on a rubber roll mill. A good dispersion can readily be obtained by empirical experimentation by those skilled in the art. A detailed view of the major petroleum oils is given in the article entitled "Hydrocarbon Composition of Rubber Process Oils" by S. Kurtz, Jr., and C. C. Martin, India Rubber World Co., 126, No. 4, July 1952, page 495 onward.

Butyl rubbers suitable for use as the principal elastomer in the present invention and closely related isoolefin copolymer compositions are more particularly described in U.S. Patent 2,822,342. The isoolefin has 4 to 14 carbon atoms inclusive; the preferred isoolefin is isobutylene. The multi-olefin has from 4 to 14 carbon atoms inclusive per molecule and is preferably a conjugated diolefin having from 4 to 8 carbon atoms per molecule such as isoprene, butadiene and the like. The preferred copolymers made from isobutylene have an average Staudinger molecular weight number within the range between 20,000 and 200,000 and a Wijs iodine number of from about 1 up to 50. The correspondingly related 8-minute Mooney viscosity values of these copolymers is at least 15. The particularly preferred copolymer contains 95–99.5% of isobutylene monomer units and 5 to 0.5% of isoprene monomer units by weight, and has the molecular weights and iodine numbers specified above. The preparation of these copolymers is described in greater detail on lines 13 to 75 of column 4 and lines 1 through 75 of column 5 of U.S. Patent 2,822,342.

The filler compound of the present invention is preferably a kaolin clay or carbon black. Any kaolin clay which is conventionally used for reinforcing elastomers can be employed to make the mixtures of the present invention. In general, these clays have particle sizes in the range of 2 microns. The finer the particle size, the better the filler responds in giving an improved vulcanizate. It is not critical whether these kaolin clays are "residual" or "sedimentary" in origin; they can be produced by any conventional process such as the dry process (air flotation) or the web process (classification in a water suspension). These clays are the clay minerals belonging to the kaolin group and have a stable non-expanding crystal lattice in which one gibbsite sheet is condensed with one silica sheet. Representative minerals include kaolinite, the most important one, nacrite, dickite, and halloysite. Kaolinite has the chemical formula $Al_2O_3 \cdot 2SiO_2 \cdot 2H_2O$. It is to be understood that these kaolins generally also contain some compounds of iron, titanium, calcium, magnesium, potassium, sodium, and occasionally manganese; in kaolinites minor proportions of hydrated aluminum silicate minerals other than kaolinite may be present. In general, the molar ratio of silica to alumina in the clay is in the neighborhood of 2:1, the value of kaolinite itself.

The principal physical characteristics of a kaolin clay which are preferred for use in the present invention are: (1) a specific gravity of about 2.60; (2) a 325-mesh screen residue below about 3.5%, preferably below about 0.35%; (3) absorbed moisture content not above about 0 to 1%; (4) a particle size distribution wherein at least about 55% by weight of the particles are two microns or less in diameter; and (5) a pH (in water) of about 4.4 to 7.0, although specially prepared and treated clays may show pH values of 8.0 or higher.

Representative "hard" and "soft" kaolins contain (by weight): 44 to 46% silica; 37.5 to 39.5% alumina; 0.5 to 2.0% iron oxide; and 1 to 2% titanium dioxide; the ignition loss of these representative clays is 13.9 to 14.0% by weight. Clays are more particularly described in the following publications: Compounding Ingredients for Rubber, third edition, 1961, Cuneo Press of New England, Cambridge, Mass., compiled by the editors of Rubber World, 630 Third Avenue, New York 17, New York; Kaolin Clays and Their Industrial Uses, J. M. Huber Corp., New York, New York, second edition, 1955; India Rubber World, vol. 118, No. 6, New York, September 1948, pages 793–795; Clays, Their Occurrence, Properties and Uses, H. Ries, third edition, John Wiley & Sons, Inc., New York, 1927; The Chemistry and Physics of Clays and Other Ceramic Materials, A. B. Searle and R. W. Grimshaw, third edition, Interscience Publishers, Inc., New York, 1959; Preliminary Reports Reference Clay Materials, American Petroleum Institute Research Project 49, Columbia University, New York, January, 1951, and X-Ray Identification and Crystal Structures of Clay Materials, edited by G. W. Brindley, London, 1951.

When carbon black is to be used channel and furnace process blacks are preferred. Stocks containing the former filler are slightly slower curing. Thus any of the channel blacks such as EPC, MPC, HPC, CC can be used. SAF furnace black is an excellent reinforcing agent; other furnace blacks such as SRF, HMF, CF, HAF, and FF can also be satisfactorily used. Thermal carbons can be employed but provide a lower order of reinforcement.

About 20 to 300 parts of filler are used per 100 parts of copolymer. When carbon black is used the amounts are frequently from 20 to 80 parts; when kaolin clay is the filler the amounts are frequently in the range of 80 to 120 parts.

The promoter is a monomeric compound selected from the group consisting of di-lower alkenyl esters of unsaturated dicarboxylic acids and N-lower alkenyl substituted amides; the compound must have at least 3 sulfur-reactable carbon-to-carbon double bonds per molecule. Suitable promoters include: diallyl esters of unsaturated dicarboxylic acids, e.g., diallyl fumerate, diallyl maleate and diallyl itaconate; N,N-diallyl amides of an unsaturated monocarboxylic acid, e.g., N,N-diallyl acrylamide and N,N-diallyl methacrylamide; and N,N,N',N'-tetraallyl succinamide and N,N,N',N'-tetraallyl terephthalamide. Other unsaturated amides can be made by reacting unsaturated amines, e.g., diallylamine, with bis-acid halides such as terephthaloyl chloride.

The proportion of the polyunsaturated monomeric promoter compound to the elastomer should be selected so that there is at least about 0.05 gram-mole of carbon-carbon double bonds in the promoter for every gram-mole of carbon-carbon double bonds in the elastomer. Otherwise vulcanizate properties tend to fall off, particularly the modulus and the compression set. The preferred ratios have values ranging from about 0.1 to about 1. Proportions giving a ratio above 1, e.g., 1.9, are usable but are not necessary and increase the sulfur requirement needlessly. In order to avoid adversely affecting the vulcanizate properties of the elastomer, it is desirable to avoid using too high a proportion by weight of the promoter compound. Those skilled in the art can determine the exact limit for each promoter compound employed by empirical experiments; however, in general, it is preferred to limit the weight to about 10% that of the elastomer with from 2 to 3% being particularly preferred.

In operating the present invention, the cure promoter system is mixed with the principal elastomer stock at any time before curing begins. Although the order of addition is not important, it is essential that both the polyunsaturated promoter compound and the sulfur for its carbon-to-carbon double bonds be present. This frequently calls for 40% or more sulfur than would be used for the elastomer alone. If this additional sulfur is missing, the polyunsaturated promoter compound will consume sulfur needed for curing the elastomer itself and lead to an inferior vulcanizate. Mixing of the components of the curable composition is carried out in the conventional manner using rubber roll mills, Banbury mixers, and the like. In order to avoid premature scorch, it is preferred to mix at temperatures in the range 75 to 100° F., well below the cure temperature.

The compositions of the present invention can be very readily cured with sulfur to give outstanding vulcanizates. Any of the procedures familiar to those skilled in the processing of natural rubber, butadiene/styrene rubber and butyl rubber are suitable. It is preferable to use a combination of sulfur, a metal oxide, and a vulcanization accelerator. In general, about 0.2 to 3.5 parts of sulfur are used per 100 parts by weight of copolymer; it is to be understood that larger or smaller concentrations may be used when deemed desirable. Zinc oxide and cadmium oxide are the preferred oxides; zinc oxide is particularly preferred because it is more efficient, lower in cost, and is less hazardous to use. The concentration of the metal oxide is important since it, in conjunction with sulfur and accelerator, controls the ultimate state of cure. At concentrations of 3 to 10 parts by weight per 100 parts by weight of elastomer, the rate and state of cure are very satisfactory as indicated by modulus, compression set, and elongation. Concentrations above 10 parts are unnecessary. Concentrations below 3 parts are less satisfactory for developing and maintaining adequate vulcanizate properties. The most active accelerators include 2-mercaptobenzothiazole, thiuram sulfides, dithiocarbamates and their simple derivatives. Of the three classes, the thiuram sulfides and dithiocarbamates are generally preferred because they produce rapid curing without attendant scorching and develop and maintain maximum physical properties even on extended curing cycles. For many uses, however, 2-mercapto-benzothiazole and its derivatives, alone or in combination with thiurams or dithiocarbamates provide adequate acceleration with processing safety. Representative accelerators include: tetramethyl thiuram monosulfide; tetramethyl thiuram disulfide; tellurium monosulfide; tetramethyl thiuram disulfide; tellurium diethyldithiocarbamate; the zinc salt of dimethyl dithiocarbamic acid; the piperidine salt of pentamethylene dithiocarbamic acid; 2-mercaptothiazoline; 2-mercaptothiazole; N,N-diethyl-thiocarbamyl-2-mercaptobenzothiazole; and 2,2'-dithiobis benzothiazole. Unlike natural rubber and styrene-butadiene rubber, the presence of a fatty acid is not necessary for the vulcanization of the α-olefin copolymers. In fact, their vulcanization is inhibited by the presence of relatively weak carboxylic acids if used in excessive amounts. At low concentrations (0.25 to 1.0 part by weight of copolymer), stearic acid is very useful as a release agent for heavily loaded stocks. Vulcanization is accomplished by heating the compounded stock (usually in a mold) at a temperature of about 266° F. (130° C.) to 356° F. (180° C.) for a period ranging from about 5 minutes to several hours; it is often preferred to cure the stock at 320° F. (160° C.) for about 20 to 30 minutes. Steam cures can be employed as well. Representative pressures can range from 60 to 225 lb./sq. in. steam and representative times can range from about 30 seconds to 30 minutes. The preferred steam cure is about 30 seconds at 225 lb./sq. in. steam pressure. The state of cure is best determined by extension modulus at 300% elongation.

It is to be understood that various modifications of the sulfur curing procedure may be employed depending upon the stock. Various procedures and modifications of sulfur curing are more particularly described in Encyclopedia of Chemical Technology, Kirk and Othmer, published by Inter-Science Encyclopedia, Inc., New York, 1953, 11, pp. 892–927; Principles of High-Polymer Theory and Practice, Schmidt and Marlies, published by McGraw-Hill Book Co., New York, 1948, pp. 556–566; Chemistry and Technology of Rubber, Davis and Blake, published by Reinhold Publishing Corp., New York, 1937, chapter 6; Introduction to Rubber Technology, edited by M. Morton, Reinhold Publishing Corp., New York, 1959, pp. 93–129; The Applied Science of Rubber, edited by W. J. S. Naunton, Edward Arnold Ltd., London, 1961, pp. 346–413, 992–1099.

The invention will now be described in and by the following examples of certain preferred embodiments wherein parts and percentages are by weight unless otherwise specified.

Example I

A sulfur-curable ethylene hydrocarbon copolymer is prepared in accordance with the general directions described in U.S. Patent 2,933,480 and consists of the following monomer units by weight: 56.5% ethylene, 40.0% propylene, and 3.5% 1,4-hexadiene. The copolymer exhibits a Mooney viscosity (ML–4/100° C.) of 90.

The filler employed is an air-floated "hard" kaolin clay (commercially available from the J. M. Huber Corporation, New York, New York, as "Suprex" clay) containing 44 to 46% silica, 37.5 to 39.5% alumina, 1.5 to 2.0% iron oxide, and 1 to 2% titanium dioxide by weight, the ignition loss being 13.9 to 14.2 by weight. The maximum moisture content is 1% by weight and the pH (in water) is 4.5 to 5.5. This clay has a specific gravity of 2.60, a 325-mesh screen residue of 0.17% by weight and the following particle size distribution (by weight): greater than 10 microns, 0.1%; 5 to 10 microns, 2.8%; 4 to 5 microns, 1.5%; 3 to 4 microns, 2.3%; 2 to 3 microns, 3.4%; 1 to 2 microns, 9.0%; 0.5 to 1.0 micron, 19.0%; and 0 to 0.5 micron, 61.9%.

Four stocks are compounded on a rubber roll mill at a temperature between 75° F. and 100° F. containing parts of ingredients according to the following recipe.

| Component: | Parts by weight |
|---|---|
| Ethylene/propylene/1,4-hexadiene copolymer | 100 |
| Kaolin clay | 120 |
| Naphthenic petroleum oil [1] | 40 |
| Zinc oxide | 5 |
| Tetraallyl terephthalamide (see table below). | |
| Tetramethyl thiuram monosulfide | 2.65 |
| 2-mercaptobenzothiazole | 0.53 |
| Sulfur | 3.31 |

[1] Flash point 445° F. Sum of N-bases and first acidaffins 1.5%; second acidaffins 28.3%; paraffins 70.2%. Viscosity-gravity constant 0.834.

The stocks thereby obtained are cured for 5, 10, and 30 minutes in a press at 320° F. (160° C.), the vulcanizates giving the following representative data at 25° C.:

|  | IA | IB | IC | ID |
|---|---|---|---|---|
| Tetraallyl terephthalamide | 1.32 | 2.65 | 3.98 | 0 |
| Cure: 5'/320° F.: | | | | |
| 300% Modulus, p.s.i | 400 | 450 | 340 | 340 |
| Tensile Strength, p.s.i | 1,340 | 1,200 | 980 | 1,710 |
| Extension at Break, percent | 800 | >1,000 | >1,000 | 960 |

[1] Flash point 445° F. Sum of N-bases and first acidaffins 1.5%; second acidaffins 28.3%; paraffins 70.2%. Viscosity-gravity constant 0.834.

|  | IA | IB | IC | ID |
|---|---|---|---|---|
| Cure: 10'/320° F.: | | | | |
| 300% Modulus, p.s.i | 600 | 580 | 510 | 430 |
| Tensile Strength, p.s.i | 1,550 | 1,370 | 1,301 | 2,000 |
| Extension at Break, percent | 850 | 905 | 990 | 840 |
| Cure: 30'/320° F.: | | | | |
| 300% Modulus, p.s.i | 800 | 760 | 630 | 600 |
| Tensile Strength, p.s.i | 1,620 | 1,450 | 1,320 | 1,731 |
| Extension at Break, percent | 645 | 720 | 865 | 670 |

Stock ID is a control containing no promoter composition.

From the above data it appears that the modulus can be substantially improved by employing the monomeric promoter compound.

*Example II*

Example I is repeated except that the promoter compound is changed to tetraallyl succinamide.

The stocks thereby obtained are cured in a press at 320° F. (160° C.) for 5, 10 and 30 minutes. The following representative data are obtained at 25° C.:

|  | IIA | IIB | IIC |
|---|---|---|---|
| Tetraallyl succinamide | 1.32 | 2.65 | 3.98 |
| Cure: 5'/320° F.: | | | |
| 300% Modulus, p.s.i | 500 | 550 | 460 |
| Tensile Strength, p.s.i | 1,350 | 1,320 | 1,200 |
| Extension at Break, percent | 970 | 940 | 1,000 |
| Cure: 10'/320° F.: | | | |
| 300% Modulus, p.s.i | 660 | 670 | 580 |
| Tensile Strength, p.s.i | 1,500 | 1,420 | 1,410 |
| Extension at Break, percent | 800 | 820 | 955 |
| Cure: 30'/320° F.: | | | |
| 300% Modulus, p.s.i | 880 | 950 | 750 |
| Tensile Strength, p.s.i | 1,560 | 1,370 | 1,380 |
| Extension at Break, percent | 620 | 540 | 790 |

The modulus of stocks prepared according to this invention (IIA–C) are greatly improved over that obtained when the promoter is omitted. (See Example I stock ID.)

*Example III*

Example II is substantially repeated except for the changes indicated herein.

The sulfur-curable ethylene hydrocarbon copolymer, made in accordance with the general procedures described in U.S. Patent 2,933,480, consists of the following monomer units (by weight): 45.7–53% ethylene, 43–50% propylene, and 4.0–4.3% 1,4-hexadiene. It exhibits a Mooney (ML–4/100° C.) viscosity of 94–105.

Eleven stocks are compounded on a rubber roll mill at a temperature between 75° F. and 100° F. according to the following general recipe.

Component: Parts by weight
Ethylene/propylene/1,4-hexadiene copolymer __ 100
Kaolin clay _____ 120
Petroleum oil _____ 20
Promoter compound (see table below).
Zinc oxide _____ 5
Zinc dimethyldithiocarbamate _____ 2.5
2-mercaptobenzothiazole _____ 0.5
Sulfur _____ 4.0

These stocks are then cured for 20 minutes at 320° F. in a press. The following representative data are obtained at 25° C.:

|  | Additive | Phr. | M300 | TB | EB |
|---|---|---|---|---|---|
| IIIA | Diallyl fumerate | 0.5 | 680 | 1,950 | 720 |
| IIIB | ----do---- | 1.5 | 780 | 1,900 | 740 |
| IIIC | Diallyl maleate | 0.5 | 740 | 2,000 | 740 |
| IIID | ----do---- | 1.5 | 780 | 1,900 | 770 |
| IIIE | Diallyl acrylamide | 0.5 | 950 | 1,750 | 610 |
| IIIF | ----do---- | 1.5 | 1,120 | 1,750 | 550 |
| IIIG | Diallyl methacrylamide | 0.5 | 800 | 2,100 | 680 |
| IIIH | ----do---- | 1.5 | 920 | 1,800 | 650 |
| IIII | Diallyl itaconate | 0.5 | 770 | 1,100 | 720 |
| IIIJ | ----do---- | 1.5 | 810 | 1,950 | 760 |
| IIIK | None | 0 | 640 | 2,020 | 690 |

*Example IV*

A butyl rubber is selected consisting of 97 weight percent isobutylene monomer units and 3 weight percent isoprene monomer units.

Two stocks are compounded on a rubber roll mill at a temperature between 75° F. and 100° F. according to the following general recipe.

Component: Parts by weight
Butyl rubber _____ 100
Kaolin clay _____ 120
Promoter compound (see table below).
Zinc oxide _____ 5
Stearic acid _____ 2
Tetramethylthiuram disulfide _____ 2
2-mercaptobenzothiazole _____ 1.5
Sulfur _____ 2

These stocks are then vulcanized for 10 to 30 minutes at 320° F. in a press. The vulcanizates obtained displayed the following stress-strain properties at 25° C.:

|  | IVA | IVB |
|---|---|---|
| Diallylacrylamide | 1 | 0 |
| Cure: 10'/320° F.: | | |
| 300% Modulus, p.s.i | 650 | 400 |
| Tensile Strength, p.s.i | 1,375 | 1,550 |
| Elongation at Break, percent | 660 | 680 |
| Cure: 30'/320° F.: | | |
| 300% Modulus, p.s.i | 775 | 600 |
| Tensile Strength, p.s.i | 1,100 | 1,000 |
| Elongation at Break, percent | 480 | 440 |

It is clear that stock IVA prepared according to this invention has a modulus greatly improved over control stock IVB containing no promoter compound.

It has been found that the minimum number of 3 sulfur-reactable carbon-to-carbon double bonds in the promoter is critical. If, for example 0.5 or 1.0 phr. of diallyl disulfide (containing only 2 double bonds per molecule) is substituted for any of the promoters of the invention in Example III, the resulting vulcanizate shows no improvement in modulus over control sample IIIK containing no promoter.

In the foregoing examples vulcanizate properties are measured in accordance with the following procedures.

| Property: | ASTM method |
|---|---|
| Stress-strain | D412–51T. |
| Compression set | D395–55, Method B. |

A distinct advantage of the promoters of the present invention is that they obviate thet necessity for carrying out the heat-treatment step when curing stocks containing a kaolin clay. Results are obtained which are comparable to those gained by the use of heat-treatment in combination with butyl rubber type heat-treatment promoters. In a similar fashion, the compression set of vulcanizates made from mixtures of this copolymer with carbon black are as good as those of vulcanizates of this copolymer which have undergone a preliminary heat-treatment of the black stock with paraquinone dioxime.

The α-olefin compositions of the present invention possesses excellent ozone resistance and weatherability (that is, freedom from cracking and crazing) which makes them especially suitable for black stock applications such as hose, windshield blades and the like. The oil extended α-olefin compositions are characterized by exceptionally improved processing behavior which makes them very easy to calender and extrude. The α-olefin compositions loaded with clay can be employed in the preparation of shoe soles and heels and a wide variety of molded articles. The uncured but compounded compositions are not affected by moisture and can be stored for lengthy periods before shaping and vulcanization.

The improved butyl stocks are useful in making inner tubes, tires, fabric impregnation and coating, air bags, cements, adhesives and materials for electrical applications.

What is claimed is:

1. A process for preparing a sulfur-cured, filler-loaded elastomeric composition which comprises mixing (I) a normally solid elastomeric copolymer selected from the group consisting of (a) a copolymer of at least one α-monoolefin of the formula R—C=CH$_2$ where R is selected from the group consisting of hydrogen and C$_1$–C$_{16}$ alkyl radicals and at least one non-conjugated hydrocarbon diene of from 5 to 22 carbon atoms, said copolymer having up to about 2 gram-moles of carbon-to-carbon double bonds per kilogram, and (b) a copolymer of an isoolefin and a conjugated diene, said isoolefin and diene having from 4 to 14 carbon atoms, and said copolymer having an iodine number of from 1 to about 50; (II) about 20 to 300 parts of a filler compound per 100 parts of copolymer; (III) a monomeric curing promoter compound selected from the group consisting of di-allyl esters of unsaturated dicarboxylic acids and N-allyl substituted amides, said promoter compound having at least 3 sulfur-reactable carbon-to-carbon double bonds per molecule and being present in an amount to give about 0.05 to 1.9 gram-moles of carbon-carbon double bonds in the promoter for every gram-mole of carbon-carbon double bonds in said copolymer; and (IV) a sulfur-curing system in amounts containing about 0.2 to 3.5 parts of sulfur per 100 parts by weight of said copolymer to react with said copolymer and up to 40% additional sulfur to react with said promoter; and heating the mixture to effect a cure.

2. A process as defined in claim 1 wherein said copolymer (a) is a copolymer containing from about 30 to 70% ethylene units, about 30 to 70% propylene units and up to 8% of at least one non-conjugated diene of from about 6 to 22 carbon atoms.

3. A process as defined in claim 1 wherein said copolymer (b) is a copolymer of at least 95% isobutylene and from about 0.5 to 5% of a conjugated diolefin having from 4 to 8 carbon atoms.

4. A process as defined in claim 1 wherein said monomeric promoter compound is a diallyl ester of an unsaturated dicarboxylic acid.

5. A process as defined in claim 1 wherein said monomeric promoter compound is an N,N-diallyl amide of an unsaturated monocarboxylic acid.

6. A process as defined in claim 1 wherein said monomeric promoter compound is an N,N,N',N'-tetraallyl diamide of a dicarboxylic acid.

7. A process as defined in claim 1 wherein said filler compound is kaolin clay.

8. A sulfur-curable, filler-loaded elastomeric composition comprising (I) a normally solid elastomeric copolymer selected from the group consiting of (a) a copolymer of at least one α-monoolefin of the formula R—C=CH$_2$ where R is selected from the group consisting of hydrogen and C$_1$–C$_{16}$ alkyl radicals and at least one non-conjugated hydrocarbon diene of from 5 to 22 carbon atoms, said copolymer having up to amout 2 gram-moles of carbon-to-carbon double bonds per kilogram, and (b) a copolymer of an isoolefin and a conjugated diene, said isoolefin and diene having from 4 to 14 carbon atoms, and said copolymer having an iodine number of from 1 to about 50; (II) about 20 to 300 parts of a filler compound per 100 parts of copolymer; (III) a monomeric curing promoter compound selected from the group consisting of di-allyl esters of unsaturated dicarboxylic acids and N-allyl substituted amides, said promoter compound having at least 3 sulfur-reactable carbon-to-carbon double bonds per molecule and being present in an amount to give about 0.05 to 1.9 gram-moles of carbon-carbon double bonds in the promoter for every gram-mole of carbon-carbon double bonds in said copolymer; and (IV) a sulfur-curing system in amounts containing about 0.2 to 3.5 of sulfur per 100 parts by weight of said copolymer to react with said copolymer and up to 40% additional sulfur to react with said promoter.

9. A composition as defined in claim 8 wherein said copolymer (a) is a copolymer containing from about 30 to 70% ethylene units, about 30 to 70% propylene units and up to 8% of at least one non-conjugated diene of from about 5 to 22 carbon atoms.

10. A composition as defined in claim 8 wherein said copolymer (b) is a copolymer of at least 95% isobutylene and from about 0.5 to 5% of a conjugated diolefin having from 4 to 8 carbon atoms.

11. A composition as defined in claim 8 wherein said monomeric promoter compound is a diallyl ester of an unsaturated dicarboxylic acid.

12. A composition as defined in claim 8 wherein said monomeric promoter compound is an N,N-diallyl amide of an unsaturated monocarboxylic acid.

13. A composition as defined in claim 8 wherein said monomeric promoter compound is an N,N,N',N'-tetraallyl diamide of a dicarboxylic acid.

14. A composition as defined in claim 8 wherein said filler compound is kaolin clay.

References Cited by the Examiner

UNITED STATES PATENTS

| 2,933,480 | 4/1960 | Gresham et al. | 260—41 |
| 2,977,345 | 3/1961 | Fischer et al. | 260—79.5 |
| 3,011,995 | 12/1961 | Smith | 260—41 |

MORRIS LIEBMAN, *Primary Examiner.*

K. B. CLARK, *Examiner.*

J. S. WALDRON, *Assistant Examiner.*